United States Patent
Kohl et al.

(10) Patent No.: US 9,423,783 B2
(45) Date of Patent: Aug. 23, 2016

(54) METHOD FOR THE PREVENTION OF ERRONEOUS ACTUATOR ACCESS IN A MULTIFUNCTIONAL GENERAL ELECTRONIC CONTROL SYSTEM

(75) Inventors: Andreas Kohl, Mainz (DE); Christian Kebbel, Frankfurt (DE)

(73) Assignee: CONTINETAL TEVES AG & CO. OHG, Frankfurt (DE)

( * ) Notice: Subject to any disclaimer, the term of this patent is extended or adjusted under 35 U.S.C. 154(b) by 2140 days.

(21) Appl. No.: 10/550,989

(22) PCT Filed: Feb. 27, 2004

(86) PCT No.: PCT/EP2004/050217
§ 371 (c)(1),
(2), (4) Date: Sep. 25, 2006

(87) PCT Pub. No.: WO2004/086157
PCT Pub. Date: Oct. 7, 2004

(65) Prior Publication Data
US 2007/0106401 A1 May 10, 2007

(30) Foreign Application Priority Data
Mar. 25, 2003 (DE) .................. 103 13 409

(51) Int. Cl.
*G05B 19/042* (2006.01)
*B60G 17/0185* (2006.01)
*B60G 17/0195* (2006.01)

(52) U.S. Cl.
CPC ....... *G05B 19/0428* (2013.01); *B60G 17/0185* (2013.01); *B60G 17/0195* (2013.01); *B60G 2202/413* (2013.01); *B60G 2600/08* (2013.01); *B60G 2800/80* (2013.01)

(58) Field of Classification Search
CPC .......... G05B 19/0428; B60G 17/0195; B60G 17/0185; B60G 2800/80; B60G 2202/413; B60G 2600/08
USPC ................ 701/48, 70; 700/9, 20, 12, 75, 23; 710/240, 241, 243, 244
See application file for complete search history.

(56) References Cited

U.S. PATENT DOCUMENTS 4,615,357 A * 10/1986 Ito ............................ 137/596.17
4,682,166 A * 7/1987 Takeuchi et al. ............... 700/10

(Continued)

FOREIGN PATENT DOCUMENTS

DE 19704841 8/1998
DE 19744230 4/1999

(Continued)

*Primary Examiner* — John Q Nguyen
*Assistant Examiner* — Jordan S Fei

(57) ABSTRACT

Disclosed is a method for the prevention of erroneous actuator access in a multifunctional general electronic control system wherein the actuator access requirements emanate from different system services (1), a rights management (2), which determines the authorization of actuator access requirements, a mode of operation control unit (4), and an access management (6) are integrated into the general control system. The rights management (2), in the event of an access requirement by a system service (1), brings about an adjustment or a change of the mode of operation according to predefined rules in consideration of the instantaneous mode of operation of the general system and reports the current mode of operation to the access management (6). Depending on the reported general mode of operation, the access management (6) allows actuation of the actuator by means of the 'authorized' system service (1) and processes the actuator access requirements of the system services (1) according to predefined arbitration rules.

8 Claims, 2 Drawing Sheets

(56) References Cited

U.S. PATENT DOCUMENTS

| | | | |
|---|---|---|---|
| 4,682,279 A * | 7/1987 | Watabe | 700/12 |
| 4,745,541 A * | 5/1988 | Vaniglia et al. | 700/12 |
| 5,041,977 A * | 8/1991 | Kawabata | B60G 17/0185 280/5.501 |
| 5,068,778 A * | 11/1991 | Kosem et al. | 700/9 |
| 5,089,984 A * | 2/1992 | Struger et al. | 700/12 |
| 5,092,625 A * | 3/1992 | Kawabata | B60G 17/0185 280/5.501 |
| 5,128,857 A * | 7/1992 | Okada et al. | 700/21 |
| 5,146,401 A * | 9/1992 | Bansal et al. | 700/9 |
| 5,170,343 A * | 12/1992 | Matsuda | B60G 17/0185 700/79 |
| 5,179,835 A * | 1/1993 | Casey et al. | 60/386 |
| 5,239,476 A * | 8/1993 | James et al. | 700/159 |
| 5,289,365 A * | 2/1994 | Caldwell et al. | 700/9 |
| 5,515,282 A * | 5/1996 | Jackson | 701/4 |
| 6,038,500 A * | 3/2000 | Weiss | 701/22 |
| 6,226,581 B1 * | 5/2001 | Reimann et al. | 701/48 |
| 6,296,325 B1 * | 10/2001 | Corio et al. | 303/20 |
| 6,357,839 B1 * | 3/2002 | Eckert | 303/142 |
| 6,442,436 B1 * | 8/2002 | Nogami | 700/19 |
| 6,463,373 B2 * | 10/2002 | Suganuma et al. | 701/48 |
| 6,633,781 B1 * | 10/2003 | Lee et al. | 700/19 |
| 6,668,199 B1 * | 12/2003 | Arcidiacono et al. | 700/12 |
| 6,701,242 B1 * | 3/2004 | Diebold | B60T 7/042 188/156 |
| 7,031,793 B1 * | 4/2006 | Jenkins et al. | 700/121 |
| 7,263,598 B2 * | 8/2007 | Ambuel | 712/34 |
| 7,274,981 B2 * | 9/2007 | Eriksson | 701/37 |
| 7,316,288 B1 * | 1/2008 | Bennett et al. | 180/413 |
| 7,421,302 B2 * | 9/2008 | Makino et al. | 700/9 |
| 7,437,202 B2 * | 10/2008 | Morrell | 700/75 |
| 2001/0049562 A1 * | 12/2001 | Takano et al. | 700/19 |
| 2002/0069310 A1 * | 6/2002 | Scandurra et al. | 710/240 |
| 2002/0083251 A1 * | 6/2002 | Chauvel et al. | 710/240 |
| 2002/0091453 A1 * | 7/2002 | Tello et al. | 700/20 |
| 2002/0103550 A1 * | 8/2002 | Andrews | 700/65 |
| 2002/0123828 A1 * | 9/2002 | Bellmann et al. | 701/1 |
| 2002/0137597 A1 * | 9/2002 | Genise et al. | 477/107 |
| 2003/0014129 A1 * | 1/2003 | Weiberle et al. | 700/19 |
| 2003/0065432 A1 * | 4/2003 | Shuman et al. | 701/48 |
| 2003/0088319 A1 * | 5/2003 | Kanai | 700/9 |
| 2003/0167108 A1 * | 9/2003 | Albrichsfeld et al. | 701/1 |
| 2003/0171865 A1 * | 9/2003 | Moser | B60G 17/0195 701/48 |
| 2003/0225494 A1 * | 12/2003 | Coelingh et al. | 701/48 |
| 2003/0225495 A1 * | 12/2003 | Coelingh et al. | 701/48 |
| 2003/0225496 A1 * | 12/2003 | Coelingh et al. | 701/48 |
| 2004/0030477 A1 * | 2/2004 | Gerdes | 701/48 |
| 2004/0044443 A1 * | 3/2004 | Eriksson | 701/1 |
| 2004/0140630 A1 * | 7/2004 | Beishline | B60G 17/0152 280/5.501 |
| 2004/0243751 A1 * | 12/2004 | Rabaioli | 710/240 |
| 2006/0041360 A1 * | 2/2006 | Post, II | 701/48 |
| 2006/0089765 A1 * | 4/2006 | Pack et al. | 701/23 |
| 2007/0106401 A1 * | 5/2007 | Kohl et al. | 700/79 |
| 2007/0213898 A1 * | 9/2007 | Saito et al. | 701/36 |
| 2008/0009986 A1 * | 1/2008 | Lu et al. | 701/29 |
| 2009/0164071 A1 * | 6/2009 | Takeda | 701/48 |
| 2009/0234551 A1 * | 9/2009 | Aswani et al. | 701/82 |

FOREIGN PATENT DOCUMENTS

| | | |
|---|---|---|
| DE | 10025493 | 12/2001 |
| DE | 10132440 | 1/2003 |

\* cited by examiner

METHOD FOR THE PREVENTION OF ERRONEOUS ACTUATOR ACCESS IN A MULTIFUNCTIONAL GENERAL ELECTRONIC CONTROL SYSTEM

BACKGROUND OF THE INVENTION

The present invention relates to a method for the prevention of erroneous actuator access in a multifunctional general electronic control system wherein the actuator access requirements emanate from different system services. The method is in particular appropriate for vehicle control systems.

Complex motor vehicle control systems are known in the art which integrate several functions such as anti-lock control (ABS), traction slip control (TCS), driving stability control (ESP), electrical overriding steering system, brake assist system, system or components diagnosis, etc. It is desired to use a joint electronic system in order to control these and other functions and auxiliary functions such as monitoring, error signaling, tire pressure monitoring, etc. The various functions and auxiliary functions are carried out or prepared to a large extent by means of the same actuators, such as pressure control valves, hydraulic pumps, warning lamps, etc. In this arrangement, the access to the individual actuators can definitely take place simultaneously. This will, of course, cause conflicts. It must be prevented that an access to an actuator is made by a control system or a control command of subordinate significance instead of a command that is more important at the moment e.g. due to safety reasons.

SUMMARY OF THE INVENTION

An object of the invention involves safeguarding that no 'erroneous', unauthorized access to an actuator takes place in a complex system of the above-mentioned type in the event of conflicting actuator access requirements. 'Erroneous' herein implies an access by a requirement which is instantaneously undesirable because a type of arbitration is demanded which is not allowable in the current mode of operation (e.g. a diagnosis measure during driving) or for various other reasons.

It has been shown that this object can be achieved by a method for the prevention of erroneous actuator access in a multifunctional general electronic control system wherein the actuator access requirements emanate from various or different system services, the special features of which reside in that a rights management, which determines the authorization of the system service for changing the instantaneous mode of operation of the general control system, a mode of operation control unit, and an access management are integrated into the system, in that the rights management in the event of an access requirement by the system service, brings about an adjustment or a change of the mode of operation according to predefined rules in consideration of the instantaneous general mode of operation of the general control system and reports the current mode of operation to the access management, and in that the access management, depending on the reported general mode of operation, allows only the 'authorized' system service to execute actuation of an actuator and processes the actuator access requirements of the system services according to predefined arbitration rules.

Thus, according to the invention, an additional rights and access management is integrated into the electronic control system of a multifunctional general control system, said management admitting access to the actuator of only those access requirements of the various or different system services which are invariably predefined and 'desired' in the respective mode of operation. The access management gives preference or priority to those actions which must be preferred for safety reasons, for example.

The rights and access management of the invention renders it possible to integrate base functions and auxiliary or extraneous functions in a system without jeopardizing the base functions. The rights and access management is used to prevent that a brake actuation request which must have priority for safety reasons cannot be connected through e.g. due to an 'erroneous', unauthorized access to an actuator. Thus, only the invention renders it possible that several more important and, depending on the situation or mode of operation, less important functions can be integrated.

In a favorable embodiment of the method of the invention, the actuator access requirements of the system services are recorded in a memory and passed on to the access management separated according to types of arbitration.

A particularly favorable embodiment of the invention resides in that the actuator access requirement emanating from a system service and admitted to pass to an actuator is determined by a two-stage arbitration, i.e. a 'vertical' and a 'horizontal' arbitration.

In another embodiment of the invention, the unauthorized access requirements are determined, eliminated or rejected in the access management in a first step depending on the reported, current general mode of operation. In a second step, vertical arbitration is used to evaluate and select the authorized access requirements according to a predefined order of priority of the types of arbitration, and higher priority is given to a 'current signal' rather than to a 'pressure signal', while higher priority is attributed to an 'ON/OFF signal' rather than to a current signal. Finally, in a third step, horizontal arbitration is used to evaluate and select the access requirements determined in the second step according to the priority of the signal by means of which the selected system service wants to drive the actuator.

It is expedient to write down the rights of the system services for a change of the mode of operation in a read-only memory to which the rights management has access, e.g. in the form of a table.

When the method of the invention is employed in a general control system for motor vehicles which, as a base system, comprises a brake system (EHB, EMB), the basic brake functions (BBF), wheel slip control functions (such as ABS, TCS, ESP), diagnosis functions (DIAG), motor pump control systems (MPA) and interfaces (BUS) are determined as system services from which actuator access requirements emanate, and checked by the rights management in connection with the access management.

Further system services such as 'customer software' (CSW), 'steering functions' (steer), etc., can still be integrated into the general system.

In a general control system for motor vehicles, a distinction is made in a favorable manner in the mode of operation control unit at least between the modes of operation 'normal operation' which occurs after termination of the starting phase in the absence of an error message, the mode of operation 'starting phase' which applies e.g. until expiry of a predetermined period of time, until a minimum speed is reached for the first time, and/or until initial testing routines are completed, the mode of operation 'diagnosis', the mode of operation 'customer software' which is initiated in the case of an actuator access requirement by an extraneous or auxiliary system, and the mode of operation 'failsafe' indicating the presence of an error message.

BRIEF DESCRIPTION OF THE DRAWINGS

Further features, advantages and possible applications of the invention can be seen in the following description of details of an embodiment by way of the accompanying drawings. In the drawings.

DETAILED DESCRIPTION OF THE DRAWINGS

The general control system which will be described as a simplified example in the following is intended for a motor vehicle with a complex brake system, such as an electrohydraulic brake system (EHB), being able to cooperate with systems and functions of most different types such as a brake assist system, speed control and collision avoidance control systems, diagnosis systems, steering systems (e.g. overriding steering system), etc. The brake system, including the associated control systems and functions ABS, TCS, ESP, etc., is considered as a base system, and the other systems or functions are considered as extraneous or auxiliary systems.

Figure 1:
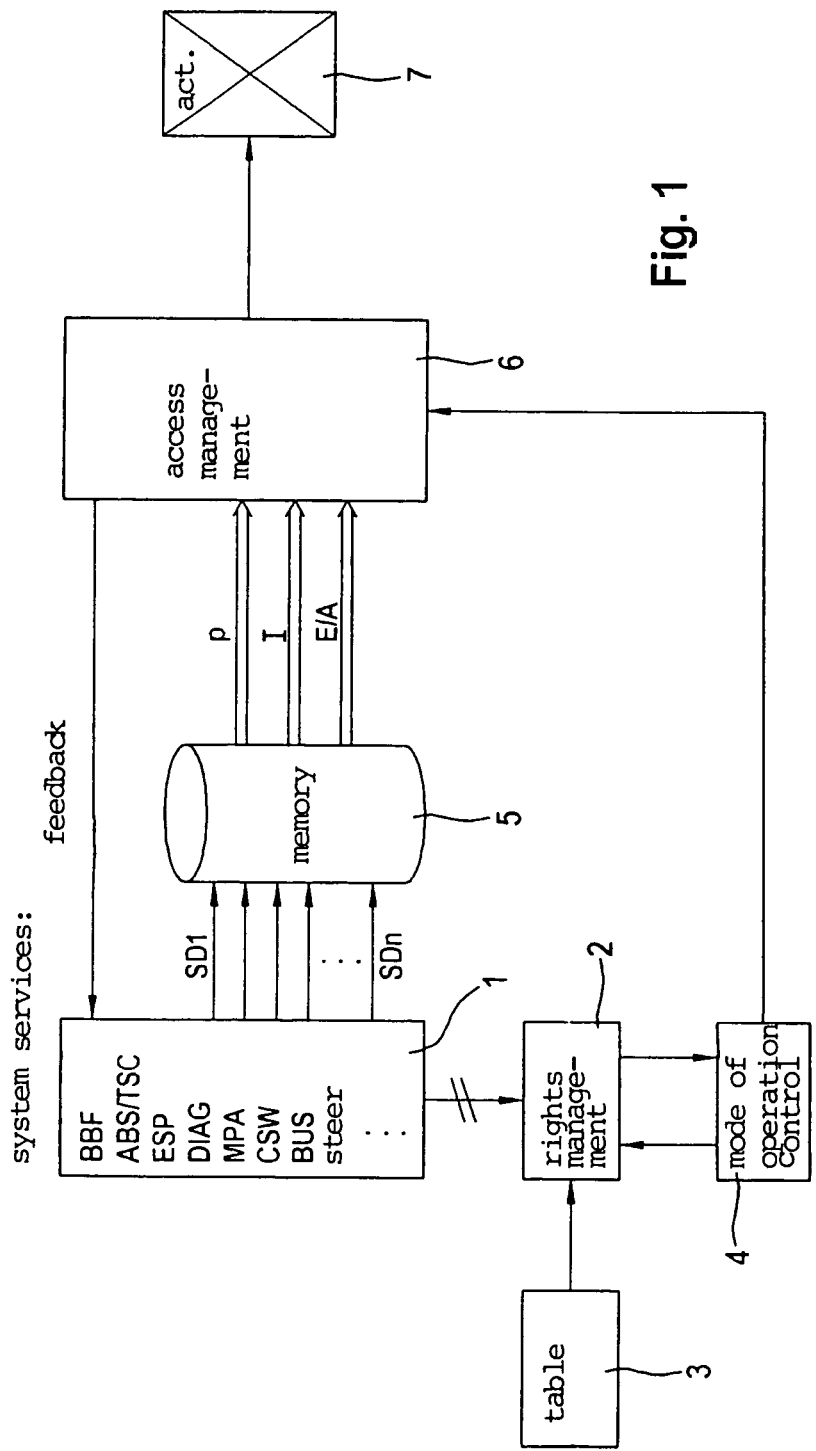
FIG. 1 shows a schematic view of function elements of a general electronic control system for implementing the method of the invention.

FIG. 1 symbolically represents in a function block 1 those services, from which actuator access requirements originate which are 'managed' according to the method of the invention, that means checked with respect to their authorization. In the embodiment of the invention described herein, the services substantially are as follows, as is indicated in 1:

BBF refers to the basic brake function demanding an electronic control even in standard situations, e.g. in brake-by-wire systems (EHB; EMB);

ABS, TCS, ESP are control functions known by the name of these abbreviations;

DIAG refers to diagnosis functions;

MPA is the term for a motor pump assembly emanating from which are also actuator access requirements;

CSW symbolizes extraneous or auxiliary systems (CSW=Customer Software);

BUS refers to an interface such as a CAN-bus, through which, among others, access requirements of accessory functions or extraneous systems (CSW) are directed;

Steer refers to steering systems such as overriding steering systems.

Access requirements of collision avoidance systems (ACC), speed control systems (cruise control), etc., can also be integrated into the general control system by means of the system service 'BUS', through the interface CSW, or through another system service with an own identity (ID).

The actuator access requirements emanating from the system services 1 are checked in a rights management 2 with respect to being allowable or authorized in the current situation, that means, in the instantaneous mode of operation (general mode of operation). A feedback from a mode of operation control unit 4 serves for this purpose.

Each service is definitely recognized by its ID. The following modes of operation which demand different reactions are e.g. of significance:

'normal' 'normal operation' is given e.g. after a longer period of operation of a motor vehicle without an error message;

'starting phase' applies, for example, as long as the individual systems are not yet in full function or routine checks have not yet been completed;

'diagnosis' this mode of operation prevails e.g. in the workshop or in the starting phase of the motor vehicle during the run of testing routines;

'CSW' customer software: this mode of operation is e.g. adjusted when the ID of the system service demanding access shows that the requirement does not originate from a base function, but from an accessory or auxiliary function or 'extraneous function';

'failsafe' an error was detected in the system causing service limitations.

The rules for judging the 'authorization' depending on the system service identified and the current mode of operation (general mode of operation) are invariably predefined. As shown in FIG. 1, the rules are stored in a read-only memory 3, e.g. in tabular form, in the described embodiment of the invention.

The access requirement of the respective system service 1 is immediately rejected or ignored by the rights management 2 if no right to the actuator access requirement has been granted in the current general mode of operation. When the requirement in the current mode of operation is 'authorized', the mode of operation control unit 4 will trigger a change of the mode of operation of the general control system, if necessary. The current mode of operation is reported to an access management 6; further, feedback is given to the rights management 2.

The actuator access requirements of the individual system services 1 are sent to the access management 6 through the signal paths SD1 to SDn, simultaneously with the check of rights in the rights management 2, through an intermediate storage 5, said access management determining according to predetermined rules and controlled by arbitration which actuator access requirement of the system services 1 in the current mode of operation is actually allowed to pass until an actuator 7. All other requirements are ignored or rejected because of 'missing authorization'; the acceptance and/or the 'rejection' of the requirement being fed back to the system services 1.

Figure 2:
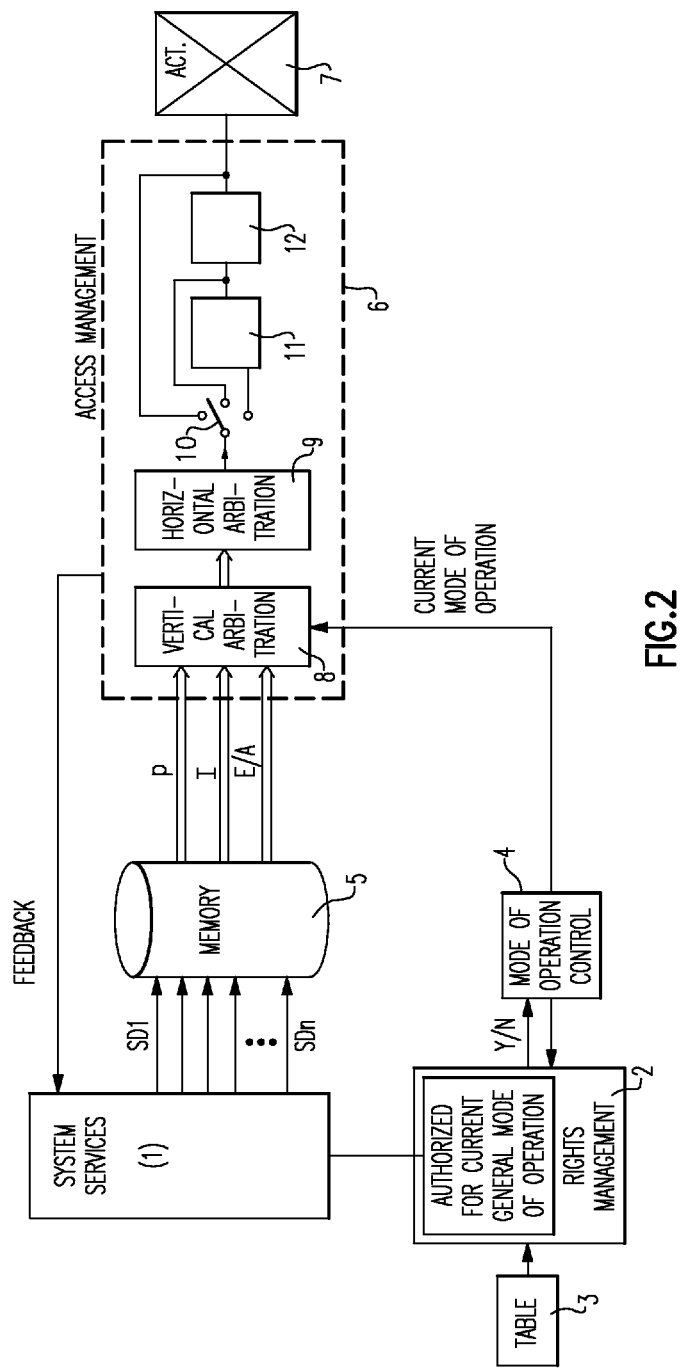
FIG. 2 shows also a schematic view of part of the general control system according to FIG. 1 for illustrating the mode of operation of the access management.

As can be seen in FIG. 2, the actuator access requirements are sorted in the intermediate storage 5 according to types of arbitration, that means, they are sorted according to signals of the same physical unit (herein: pressure 'p', current 'I', or ON/OFF signal 'E/A') and relayed to the access management.

In the access management 6, the requirements 'not authorized' in the current general mode of operation are rejected or eliminated in a first step. Subsequently, a two-stage arbitration of the remaining actuator access requirements takes place. In a first step, symbolized by a block 8 in FIG. 2, the 'authorized' requirements are evaluated according to a predetermined order of rank or priority of the individual types of signals of the same physical unit. Sorting according to signals of the same physical unit is referred to as 'vertical' arbitration.

Subsequently, an evaluation of the remaining requirements of the same type of physical unit is carried out in a second step or a second stage 9 by 'horizontal' arbitration. In the second stage, it is determined which one of the actuator access requirements is actually allowed to pass up to the actuator 7. Symbolized by a change-over switch 10, the output signal of the step 9—depending on the type of arbitration, that means, herein 'pressure', 'current', or 'ON/

OFF' signal—is passed on to the actuator 6 directly or after further processing in a pressure controller 11 and/or in a current controller 12.

In the embodiment of the invention described herein, the actuator 7 is a coil, e.g. the valve coil of a brake pressure control valve. A command or signal of the unit or dimension 'ON/OFF' causes a direct reaction of the valve. The 'ON/OFF' signal is therefore granted the 'highest' priority in the sense of the vertical arbitration. A signal of the unit or dimension 'current', however, must initially be evaluated in a current controller 12 (see FIG. 2) and converted into an 'ON/OFF' command. A pressure change requirement, meaning a signal of the dimension 'pressure', must first be converted into a current change requirement in a pressure controller 11 and thereafter converted into an actuator actuating signal or into an 'ON/OFF' signal by means of the current controller 12. A signal of the dimension 'current' is therefore given higher priority than a signal of the dimension 'pressure' in the present embodiment. With competing signals of the dimension 'pressure', 'current' and 'ON/OFF', the E/A signal is executed. In the absence of an E/A signal, the current signal is preferred in the vertical arbitration.

The access management 6 selects the actuator access requirements according to predefined rules depending on the current mode of operation. For example, only pressure nominal value requirements are 'legitimate' in the mode of operation 'normal' and are evaluated; other requirements are rejected or ignored by the access management 6. In the mode of operation 'customer software' (CSW), only correcting commands or actuator access requirements in the form of pressure signals are permitted. In the mode of operation 'diagnosis', correcting commands in the form of current signals or valve alter statements rather than in the form of pressure signals are allowable. Only actuator requirements which emanate from the core system, covering above all the safety-critical system services, are 'legitimate' in the failsafe mode of operation 'failsafe,' Therefore, no actuator requirements from accessory systems, auxiliary systems of customer systems (CSW) are implemented.

These are only relatively simple examples. A number of further specifications can be realized using the access management 6 in connection with the rights management 2 (3).

The invention claimed is:

1. A method for the prevention of erroneous actuator access in a multifunctional general electronic control system wherein actuator access requirements for directing operation of an individual actuator emanate from various different system services (1), the method comprising:
    receiving actuator access requirements for directing operation of an individual actuator from at least one of a plurality of different system services;
    determining authorization of a system service for changing a current mode of operation of the general electronic control system in response to receiving the actuator access requirements for directing operation of the individual actuator from one of the plurality of different system services, wherein the current mode of operation includes one of a normal mode of operation which occurs after termination of a starting phase in the absence of one of an error message and an actuator access requirement by an extraneous or auxiliary system, a starting phase mode of operation which applies until expiration of a predetermined period of time, until a minimum speed is reached for the first time, or until an include diagnosis mode including initial testing routines are completed, a customer software mode of operation which is initiated in a case of an actuator access requirement by an extraneous or auxiliary system, and a failsafe mode of operation indicating the presence of an error message;
    changing the current mode of operation of the individual actuator according to predefined rules in consideration of the current mode of operation;
    reporting the current mode of operation;
    depending on the reported current mode of operation, performing a vertical arbitration step with an access management system including allowing an actuator actuation of the individual actuator only by an authorized system service and blocking access requirements that are not authorized for the current mode; and
    processing with the access management system the actuator access requirements of the system services according to horizontal arbitration rules to determine which of the actuator access requirements is passed to an actuator based on a form of the access requirement including one of an on/off signal, a current signal and a pressure signal, wherein the on/off signal is prioritized over the current signal and the pressure signal.

2. The method according to claim 1, wherein the actuator access requirements are recorded in a memory and sent to an access management sorted according to types of arbitration.

3. The method according to claim 1, wherein one of the actuator access requirements includes a signal for driving the individual actuator is admitted to pass to the individual actuator based on a two-stage arbitration.

4. The method according to claim 3, wherein unauthorized access requirements are determined, eliminated or rejected in a first step depending on the reported current mode of operation, wherein the vertical arbitration is performed to evaluate and select authorized access requirements according to a predefined order of priority of arbitration, wherein, higher priority is given to signals for the failsafe mode when an error is detected and the normal mode of operation is given priority in the absence of a error message.

5. The method according to claim 1, wherein rights of the system services for a change of the current mode of operation are written down in a read-only memory.

6. A general control system for motor vehicles comprising:
    a rights management system which determines authorization of a system services for changing a current mode of operation of the general control system directing operation of an individual actuator in the event of an actuator access requirement in a current operating mode;
    a mode of operation control unit (4); and
    an access management system (6) that receives an actuator access requirement for directing operation of an individual actuator from a rights management system (2) in the event of an access requirement by a plurality of system services that each seek control of the individual actuator (1) based on a vertical arbitration evaluation and brings about an adjustment or a change of the current mode of operation of the individual actuator according to the vertical arbitration evaluation in consideration of the current mode of operation of the general control system and reports the current mode of operation to the access management system (6), and depending on the reported current mode of operation, performs a horizontal arbitration evaluation of an output signal based on the current mode of operation, wherein the output signal is one of an on/off signal, a current signal and a pressure signal and the horizontal arbitration evaluation selects which of the output signals are passed to the individual actuator with the on/off signal given the highest priority over a current signal and a pressure signal;

wherein the plurality of system services (1) that originate actuator access requirements include one of basic brake functions (BBF) for a brake-by-wire system (EHB, EMB), wheel slip control functions including at least one of an anti-lock control (ABS), traction slip control (TCS), and driving stability control (ESP), diagnosis functions (DIAG), motor pump control systems (MPA) and interfaces (BUS).

7. The system according to claim 6, wherein at least one further one of the plurality of system services includes one of a customer software (CSW) and steering functions (steer) is integrated into the general control system.

8. The system according claim 6, wherein a distinction is made in the mode of operation control unit for vertical arbitration evaluation between:

a normal mode of operation which occurs after termination of a starting phase in the absence of one of an error message and an actuator access requirement by an extraneous or auxiliary system, a starting phase mode of operation which applies until expiration of a predetermined period of time, until a minimum speed is reached for the first time, or until an included diagnosis mode including initial testing routines are completed;

a customer software mode of operation which is initiated in a case of an actuator access requirement by an extraneous or auxiliary system, and a failsafe mode of operation indicating the presence of an error message.

\* \* \* \* \*